United States Patent Office 3,279,980
Patented Oct. 18, 1966

3,279,980
COMPOSITION FOR AND METHOD OF TREATING WATER
Robert M. Stern, % Great Lakes Biochemical Co., Inc., 710 N. Plankinton Ave., Milwaukee, Wis.
No Drawing. Filed Feb. 28, 1964, Ser. No. 348,282
4 Claims. (Cl. 167—22)

This invention relates to compositions for use particularly as algicides for the treatment of water and methods of such treatment.

Algae are small or microscopic organisms which possess an internal green pigment called chlorophyll. This group of organisms are the normal inhabitants of surface waters and are encountered in every water supply that is exposed to sunlight. If ideal conditions for their growth exist in a water supply, it is possible within 24 hours to develop a thriving algae population. Furthermore, if waters contain considerable dissolved minerals and other suspended matter, these serve as nutrients for the growth of algae and other microscopic aquatic life.

The problem of algae control is a serious and ever-present one in swimming pools as well as any water supply exposed to light. The presence of even small numbers of algae in swimming pools or other water supplies tend to clog filters and impart disagreeable tastes and odors to the water. Furthermore, they tend to interfere with the action of chlorine, iodine, bromine, and other common disinfectants used in swimming pools. Chlorine, which is the most widely used disinfectant, is not only a poison to protein systems because of the formation of chloramines, but it is also a powerful oxidizing agent. Thus, if there is any organic matter present in the pool there will be no free available chlorine until the organic material is destroyed or oxidized by the chlorine. Therefore, it might be assumed that if there is free available chlorine present in a swimming pool, no algae can be alive. However, it has been shown both experimentally in the laboratory as well as in practical tests in swimming pools that the presence of ½–1 p.p.m. of free residual chlorine will not kill many strains of algae commonly present in swimming pools even after two hours contact time.

Furthermore, once algae have developed in a swimming pool, particularly the so-called "wall-clinging" types such as strains of Phormidium and Oscillatoria, even super-chlorination of the water (10 p.p.m. free available chlorine) cannot destroy the algae mats which often form on the sides and bottoms of the pools. Chlorine, therefore, can be effective as an algistat to prevent the growth and development of a large algae population but it is not an effective algicide in controlling and killing the so-called "Black Algae" which cause the biggest problems in swimming pools.

Copper sulfate and other copper salts have also been used to control algae in swimming pools. However, since many pool waters are extremely hard and high in alkalinity, and tend to become more so because of evaporation of water from the pool and by the addition of a variety of pool chemicals, copper sulfate is readily precipitated out and therefore has little effect on the algae. Another disadvantage of copper treatment is the possibility of "dyeing" a swimmer's hair or swimming suit in the presence of too high a concentration of copper. Furthermore, even under the most ideal conditions copper salts are not effective against the troublesome strains of black algae.

Another group of compounds which have been used to control algae in swimming pools are the quaternary ammonium halide compounds. While this group of chemicals has shown promise in the laboratory and test tube trials, it has not been effective in actual swimming pool use. The principal reason for the failure of these compounds other than the fact that they may produce excessive foaming and cloudiness of the water, is the fact that they rapidly and completely adsorb on sand and diatomaceous earth filter media.

It has also been reported in the literature that strains of bacteria as well as algae have become highly resistant to quaternary ammonium halides. Some of these strains have been isolated and their resistance confirmed in the laboratory. Furthermore, this group of compounds tends to cause a cloudiness of the water and the material causing the cloudiness tends to clog up both sand and diatomaceous earth filters. This tendency to clog filters will very markedly shorten the filter run so that such filters must be backwashed considerably more often than would normally be the case if the quaternary ammonium halides were not added to the water.

Another compound that has been used for the control of algae in swimming pools is 2,3-dichloro-1,4-naphthoquinone. This compound is soluble in water only to the extent of $\frac{1}{20}$ of the required concentration (2 p.p.m.) necessary to control algae. Furthermore, 2,3-dichloro-1,4-naphthoquinone will readily react with many metals, including iron, copper and manganese to cause an undesirable color or pigment to develop in the pool and render the compound inactive. This compound also is not effective against many strains of algae.

Another disadvantage of many commercial algicides used in swimming pools is the large chlorine demand they exhibit. Recent data has shown that most commercial algicides formulated with quaternary ammonium halides, when added to water at the recommended initial concentrations of the manufacturers, have definite chlorine demands ranging from 44 to 64% of free available or total residual chlorine.

It has been found that remarkably improved algistatic and algicidal results can be obtained by the use of chemical formulations and methods described below. It can be shown by the use of these new formulations and procedures that algae commonly present in swimming pools, including well-developed "Black Algae" growths, can be killed and readily removed without resorting to such drastic measures as emptying the pool and removing these growths by the use of wire brushes and treatment with muriatic acid. Furthermore, the formula and methods referred to in this invention overcome the basic objections to the chemicals described above for use as algicides. The formulae described herein are effective in all types of water whether hard or soft, acid or alkaline. The active ingredients are not precipitated out readily as is the case with copper sulfate. Neither are the ingredients of this formula adsorbed on either sand or diatomaceous earth filters, thus rendering them ineffective as is the case with quaternary ammonium halides. The formulae herein described also will not cause excessive foaming or clouding of the water nor do they have any appreciable adverse effect on the chlorine demand.

One object of the present invention is to provide a composition of chemicals when used together produce a synergistic effect which will effectively kill (algicidal effect) algae and prevent (algistatic effect) the growth of particularly resistant strains of algae in swimming pools, ponds, heat exchangers, air conditioners, and other waters.

Another object of the invention is to provide methods for killing (algicidal effect) algae and preventing (algistatic effect) the growth of algae in swimming pools, ponds, heat exchangers, air conditioners and other waters.

Broadly stated, the present invention involves the treatment of water used in swimming pools, etc. with a composition comprising a mixture of a mercury salt and an additional salt having algicidal properties such as a salt of a fatty acid amine. Such salts when used together produce a synergistic effect as an algicide as will be described and illustrated in detail hereinafter. Some of the particular mercury salts which may be employed with good results are phenyl mercuric acetate, phenyl mercuric propionate, and phenyl mercuric oleate. Some of the salts having algicidal properties which show pronounced synergistic effects with the mercury salts are the salts of a fatty acid amine such as N-coco-amine acetate, quaternary ammonium halides, di (N,N dimethylalkylamine) salt of 3-6-endoxohexaphydrophthalic acid, zinc salts and silver salts. While the proportions of the two ingredients can vary to some extent the composition should contain at least .01% of the mercury salt by weight, the preferred range being from about 10% to 60%. Similarly, the amounts of the composition employed to effectively treat water containing algae can also vary. It has been found, however, that treatment with concentrations of as little as .10 p.p.m. are toxic to Black Algae, the preferred range being from about .15 to .50 p.p.m.

The objectives of this invention will be illustrated but are not limited by the following examples either with respect to the types of chemicals employed or the quantities used.

Example I

Purpose: To test the synergistic effect exhibited by phenyl mercuric acetate and N-coco-amine acetate when formulated as an algicide.

Procedure: A nutrient solution using tap water to which had been added 21 p.p.m. nitrogen ($NaNO_3$), 0.9 p.p.m. phosphorous ($K_2HPO_4$), and 1 p.p.m. iron ($FeCl_3$) was adjusted to pH 7.0 and dispensed in 25 ml. quantities in 50 ml. Erlenmeyer flasks. The flasks and their contents were sterilized for 15 minutes at 120° C. After sterilization the contents of the flasks were inoculated with Chlorella sp. (Wis. 2005) so that each ml. of nutrient solution contained 300,000 cells. Different concentrations of a 4.75 percent solution of phenyl mercuric acetate and different concentrations of a mixture of 4.75 percent phenyl mercuric acetate and 3.75 percent N-coco-amine acetate were added to the inoculated medium. After six days cell counts were made to test for algicidal activity.

The results obtained were as follows:

| Mixture Tested | Concentration Tested, p.p.m. | No. of Chlorella Cells per ml. |
|---|---|---|
| 4.75% Phenyl mercuric acetate | ½ | 140,000 |
| 4.75% Phenyl mercuric acetate plus 3.75% N-coco-amine acetate | ½ | 90,000 |

The data shows that the combination of phenyl mercuric acetate and N-coco-amine acetate was 55% more effective as an algicide than phenyl mercuric acetate alone.

Example II

To a nutrient solution similar to that described in Example I and inoculated with Chlorella sp. (Wis. 2005) at a concentration of 300,000 cells per ml. were added different concentrations of a 4.5 percent solution of phenyl mercuric acetate, different concentrations of zinc sulfate and different concentrations of both chemical compounds. The results obtained were as follows:

Concentration of chemicals tested to obtain 100% kill of Chlorella cells, p.p.m.

Chemicals tested:
- 4.5% phenyl mercuric acetate _____ 2
- 100% zinc sulfate (not 100% kill) _____ 16
- 4.5% phenyl mercuric acetate _____ 1½ plus
- 100% zinc sulfate _____ 0.6

Example III

To a nutrient solution similar to that described in Example I and inoculated with Chlorella sp. (Wis. 2005) at a concentration of 300,000 cells per ml., were added different concentrations of 4.5% phenyl mercuric acetate, different concentrations of di (N,N dimethylalkylamine) salt of 3-6 endoxohexaphydrophthalic acid and different concentrations of both of these chemical compounds. The results obtained were as follows:

Concentrations of chemicals tested to obtain 100% kill of Chlorella cells, p.p.m.

Chemicals tested:
- 4.5% phenyl mercuric acetate _____ 2
- 100% di (N,N dimethylalkylamine) salt of 3-6-endoxohexaphydrophthalic acid _____ 0.5
- 4.5% phenyl mercuric acetate _____ 1.0 plus
- 100% di (N,N dimethylalkylamine) salt of 3-6-endoxohexaphydropthalic acid _____ .2

Similar examples of this synergistic effect have been obtained with other organic mercurial compounds and such diverse chemicals as zinc naphtherate, silver metharsonate, potassium chromate, quaternary ammonium halides, and numerous other compounds.

It has previously been pointed out that one of the objectives of the present invention is to provide a formulation of chemicals which will have both algistatic and algicidal properties against common types of algae. It is not only necessary to kill all existing algae growths in a swimming pool or other bodies of water but also to prevent subsequent growths of algae which are constantly being introduced into the water from various sources. We have found that combinations of organic mercurials with other organic and inorganic compounds such as given in the example above not only show their action to be algistatic, i.e. stopping the growth of algae, but also show these combinations to be algicidal as well, even being able to penetrate and kill strains of Oscillatoria and Phormidium, commonly referred to in the swimming pool industry as "Black Algae." This objective of the invention is illustrated, but is not limited, by the foregoing example.

Example IV

Purpose: To test if phenyl mercuric acetate and N-coco-amine acetate when formulated as an algicide have algistatic or algicidal properties.

Procedure: Black Algae (Phormidium inundatum) were inoculated into a nutrient solution as described in Example I. Different concentrations of a solution containing 4.75% of phenyl mercuric acetate and 3.75% N-coco-amine acetate were also added to the inoculated solutions to determine toxic effect on the algae. After seven days, milliter samples of algae from the toxicity tests were transferred to fresh nutrient solution to test for viability of algae.

RESULTS (1) Tests indicated concentrations of 2, 3 and 4 p.p.m. of the mixture of phenyl mercuric acetate and N-coco-amine acetate were toxic to Black Algae.

(2) Dilution tests of the above cultures indicated that action of the mixture of phenyl mercuric acetate and N-coco-amine acetate is algicidal, i.e. algae were killed and had not merely stopped growing.

Conclusion: Mixtures of phenyl mercuric acetate and N-coco-amine acetate are algicidal in action, i.e. they will penetrate and kill Black Algae.

Example V

Purpose: To show the synergistic effect of an algicide containing mixture of N-coco-amine acetate and phenyl mercuric acetate.

Procedure: Actively growing cultures of Chlorella pyrenoidosa (Wis. 2005) were inoculated into nutrient media as described in Example I. Different concentration of a 3% solution of phenyl mercuric acetate and a 25% solution of N-coco-amine acetate were also added separately and in combination to the inoculated media to determine the toxic effect on the algae of the added solutions.

RESULTS

| Mixtures Tested | Concentration of Mixtures Tested, p.p.m. | Inhibition of Growth, percent |
| --- | --- | --- |
| Control | 0 | 0 |
| 3% Phenyl mercuric acetate | 3/8 | 50 |
| Do | 3/4 | 75 |
| Do | 1 1/8 | 100 |
| Do | 1 1/2 | 100 |
| 25% N-coco-amine acetate | 1 1/2 | 50 |
| Do | 2 | 100 |
| Do | 3 | 100 |
| 3% Phenyl mercuric acetate plus 25% N-coco-amine acetate | 1/2 | 50 |
|  | 3/4 | 100 |
|  | 1 | 100 |

*Conclusions*: The results of these tests indicate that the mixture of 3% phenyl mercuric acetate and 25% N-coco-amine acetate is more effective as a toxic chemical to the test algae than the separate components. The 3% phenyl mercuric acetate alone required 1 1/8 p.p.m. to give 100% growth inhibition. The N-coco-amine acetate required 2 p.p.m. to give 100% growth inhibition. The mixture containing 3% phenyl mercuric acetate and 25% N-coco-amine acetate gave 100% growth inhibition at 3/4 p.p.m. This is considerably less than either component could accomplish when tested at the same concentration.

I claim:
1. An algicidal and aglistatic composition for treatment of water in a swimming pool or the like consisting essentially of:
   a mixture of phenyl mercuric acetate and N-coco-amine-acetate in a ratio of about 6 to 4 of the former to the latter, said mixture to be added to the water in the pool in a concentration of at least .025 p.p.m.
2. An algicidal and algistatic composition for treatment of water in a swimming pool or the like consisting essentially of:
   a mixture of phenyl mercuric acetate and N-coco-amine acetate in a ratio of about 6 to 4 of the former to the latter, said mixture to be added to the water in the pool in a concentration of about .025 to 10 p.p.m.
3. A method of effectively killing algae and preventing its growth in water which consists essentially of the step of:
   contacting waters containing said algae with a mixture of phenyl mercuric acetate and N-coco-amine acetate having a ratio of about 6 to 4 of the former to the latter, said mixture added to the water in a concentration of at least .025 p.p.m.
4. A method of effectively killing algae and preventing its growth in water which consists essentially of the step of:
   contacting waters containing said algae with a mixture of phenyl mercuric acetate and N-coco-amine acetate having a ratio of about 6 to 4 of the former to the latter, said mixture added to the water in a concentration of about .025 to 10 p.p.m.

References Cited by the Examiner

UNITED STATES PATENTS

| 2,221,339 | 11/1940 | Allison | 210—23 |
| 2,247,711 | 7/1941 | Ralston et al. | 210—23 |
| 2,393,293 | 1/1946 | Corley | 210—23 |
| 2,657,179 | 10/1953 | Robinson | 210—23 |
| 2,686,119 | 8/1954 | Buckman et al. | 92—3 |
| 2,853,449 | 9/1958 | Moudry et al. | 210—64 |
| 2,878,155 | 3/1959 | Cruickshank | 167—22 |
| 2,944,967 | 7/1960 | Dunklin et al. | 210—64 |
| 3,122,502 | 2/1964 | Waldman et al. | 252—8.8 |
| 3,140,976 | 7/1964 | Berenschot et al. | 167—22 |
| 3,201,311 | 8/1965 | Antonides et al. | 167—22 |

FOREIGN PATENTS

| 1,125,118 | 3/1962 | Germany. |

OTHER REFERENCES

Chem. Abstracts 53: 19270–19271 (1959).
Chem. Abstracts 57: 6355g (1962).
Chem. Abstracts 60: 2269f Jan. 20, 1964.

LEWIS GOTTS, *Primary Examiner.*
ELBERT L. ROBERTS, SHEP K. ROSE,
*Assistant Examiners.*